United States Patent
Tanaka et al.

(10) Patent No.: US 6,730,385 B1
(45) Date of Patent: May 4, 2004

(54) PERFLUORORUBBER LAMINATE AND PROCESSES FOR PRODUCING THE SAME

(75) Inventors: Hiroyuki Tanaka, Settsu (JP); Shoji Kawachi, Settsu (JP); Masanori Yamashita, Settsu (JP); Yoshihiro Shirai, Settsu (JP); Yutaka Ueta, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/530,138

(22) PCT Filed: Oct. 22, 1998

(86) PCT No.: PCT/JP98/04773
§ 371 (c)(1),
(2), (4) Date: Apr. 27, 2000

(87) PCT Pub. No.: WO99/21710
PCT Pub. Date: May 6, 1999

(30) Foreign Application Priority Data

Oct. 27, 1997 (JP) ................................. 9-293893

(51) Int. Cl.$^7$ ............................ B32B 1/00; B32B 25/04; B32B 31/26
(52) U.S. Cl. ...................... 428/66.4; 428/420; 428/421; 428/422; 156/326; 156/327; 156/335
(58) Field of Search ................................ 428/421, 422, 428/36.8, 906, 420, 66.4; 492/56; 156/326, 327, 335

(56) References Cited

U.S. PATENT DOCUMENTS

| | | | | |
|---|---|---|---|---|
| 4,035,565 A | * | 7/1977 | Apotheker et al. | 524/545 |
| 4,243,770 A | | 1/1981 | Tatemoto et al. | 525/331 |
| 4,251,399 A | | 2/1981 | Tomoda et al. | 525/126 |
| 4,487,903 A | | 12/1984 | Tatemoto et al. | 526/247 |
| 4,530,972 A | | 7/1985 | Tatemoto et al. | 525/276 |
| 4,826,731 A | * | 5/1989 | Wagner et al. | 428/422 |
| 5,001,278 A | | 3/1991 | Oka et al. | 568/615 |

FOREIGN PATENT DOCUMENTS

| | | |
|---|---|---|
| GB | 1511326 A | 5/1978 |
| JP | 5117969 A | 2/1976 |
| JP | A52117981 | 10/1977 |
| JP | 53125491 A | 11/1978 |
| JP | 5550050 A | 4/1980 |
| JP | 55108410 A | 8/1980 |
| JP | 5871906 A | 4/1983 |
| JP | A61204233 | 9/1986 |
| JP | 6212734 A | 1/1987 |
| JP | 6454037 A | 3/1989 |
| JP | 6-279747 | 10/1994 |
| JP | A6298950 | 10/1994 |

OTHER PUBLICATIONS

English Translation of JP 6–298950, Oct. 1994.*
Derwent 1995–011939, abstract of JP 6–298950, Oct. 1994.*
Machine assisted translation of JP 6–298950, Oct. 1994.*

* cited by examiner

Primary Examiner—Ramsey Zacharia
(74) Attorney, Agent, or Firm—Birch, Stewart, Kolasch & Birch, LLP

(57) ABSTRACT

A laminate, which is in the form of an O-ring, a square ring, a rubber roll, a diaphragm, a rubber hose, a rubber tube or a vial stopper, comprising a layer of a perfluororubber, a layer of other rubber and an adhesive layer containing a polyfunctional compound which adheres the rubber layers by vulcanization is produced by coating a polyfunctional compound on a surface of at least one of the perfluororubber layer or the other rubber layer, laminating the layers with the coated surface facing the other layer, and vulcanizing the layers to adhere them. Thereby, the adhesion strength between the layer of perfluororubber and the layer of the other rubber is improved.

11 Claims, 2 Drawing Sheets (a)

(b)

PERFLUORORUBBER LAMINATE AND PROCESSES FOR PRODUCING THE SAME

This application is the national phase under 35 U.S.C. §371 of PCT International Application No. PCT/JP98/04773 which has an International filing date of Oct. 22, 1998, which designated the United States of America.

FIELD OF THE INVENTION

The present invention relates to a laminate of a perfluororubber and a method for producing the same. In particular, the present invention relates to a laminate comprising a layer of a perfluororubber and a layer of other rubber, which are adhered by vulcanizing, and a method for producing the same.

BACKGROUND ART

Perfluororubbers are used in various fields which require chemical resistance, thermal properties (in particular, high temperature properties), etc., since they are excellent in such properties.

However, the perfluororubbers are generally expensive and have inferior mechanical properties (e.g. tensile strength, elongation at break, etc.) to general fluororubbers. Thus, it is preferable to use the perfluororubbers in the form of a laminate with other materials, but the perfluororubbers inherently have low adhesion properties with other materials. Furthermore, neither primers nor adhesives have been developed to adhere the perfluororubbers to other materials in good condition.

JP-A-64-54037 proposes the addition of an adhesion aid to other rubbers which are adhered to the perfluororubbers to improve the adhesion properties between them. However, in the case of a laminate comprising a layer of other rubber and a layer of a perfluororubber surrounding the layer of the other rubber, the adhesion aid compounded in the other rubber cannot diffuse outside of the laminate in the course of the secondary vulcanization. Rather, the adhesion aid accumulates at the interface between the layer of the other rubber and the layer of the perfluororubber, and interferes with the adhesion between the layers.

SUMMARY OF THE INVENTION

One object of the present invention is to provide a laminate comprising a layer of a perfluororubber and a layer of other material, in particular, other rubber, which are bonded with a high adhesion strength, irrespective of the shape of the laminate.

Another object of the present invention is to provide a method for producing such a laminate.

To achieve the above objects, the present invention provides a laminate comprising a layer of perfluororubber, a layer of other rubber and an adhesive layer containing a polyfunctional compound which adheres both rubber layers by vulcanization, and a method for producing a laminate comprising the steps of coating a polyfunctional compound on a surface of at least one of a layer of a perfluororubber and a layer of other rubber, laminating the layers with the coated surface facing the other layer, and vulcanizing the layers to adhere them.

DETAILED DESCRIPTION OF THE INVENTION

Figure 1:
FIG. 1 is a cross section of one example of an O-ring and a square ring.
Figure 2:
FIG. 2 is a cross section of one example of an O-ring and a square ring.
Figure 3:
FIG. 3 is a cross section of one example of an O-ring and a square ring.
Figure 4:
FIG. 4 is a cross section of one example of an O-ring and a square ring.
Figure 5:
FIG. 5 is a cross section of one example of an O-ring and a square ring.
Figure 6:
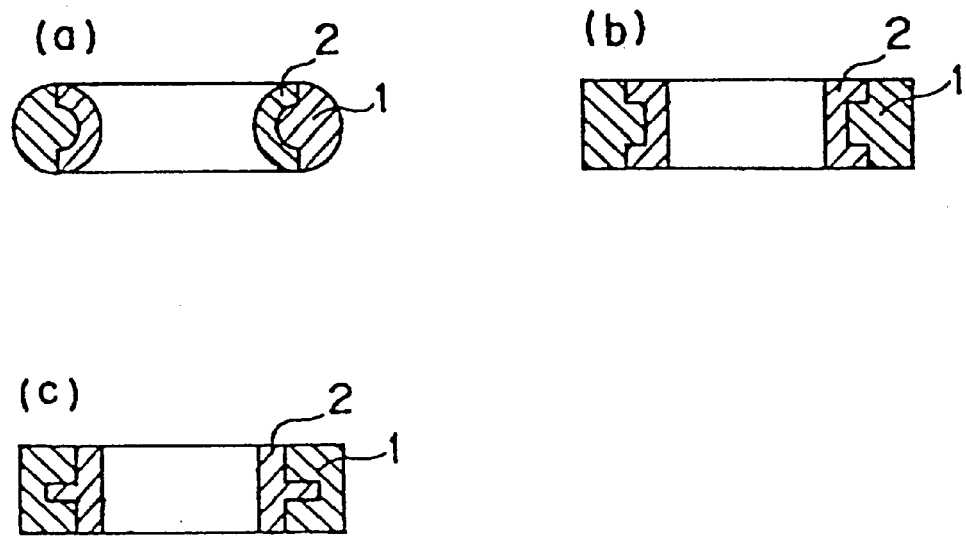
FIG. 6 is a cross section of one example of an O-ring and a square ring.
Figure 7:
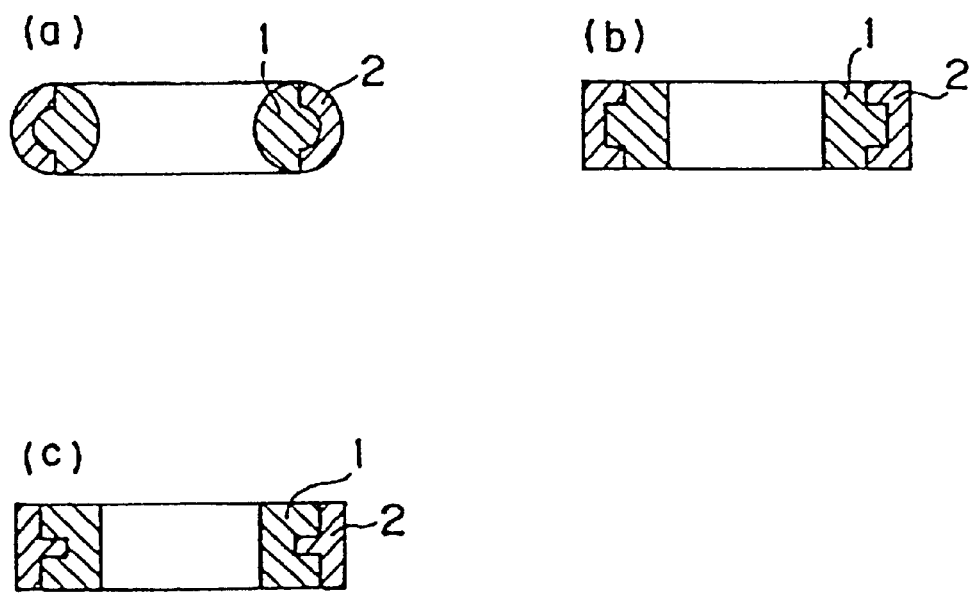
FIG. 7 is a cross section of one example of an O-ring and a square ring.

The perfluororubber used in the present invention may be a known perfluororubber. A preferable example of the perfluororubber is a copolymer of a perfluoroalkylene having 2 to 6 carbon atoms, preferably, tetrafluoroethylene, a perfluoroalkyl vinyl ether of the formula (I):

$$Rf-O-(CFXCF_2O)_n-CF=CF_2 \quad (I)$$

wherein Rf is a perfluoroalkyl group having 1 to 5 carbon atoms, X is a fluorine atom or a trifluoromethyl group, and n is an integer of 0 to 4, and a component providing a vulcanizing site.

The basic production method of such a copolymer is disclosed in JP-A-58-71906 (U.S. Pat. No. 4,487,903).

Proportions of the perfluoroalkylene, the perfluoroalkyl vinyl ether of the formula (I) and the component providing a vulcanizing site are not limited, and may be suitably selected according to the properties required for the perfluororubbers.

In general, 0.1 to 60% by mole of the perfluoroalkyl vinyl ether of the formula (I), 35 to 95% by mole of the perfluoroalkylene and 0.01 to 5% by mole of the component providing a vulcanizing site are polymerized.

When a peroxide vulcanizing system is used as a vulcanizing system, examples of the component providing a vulcanizing site include a compound of the formula (II):

$$RBr_xI_y \quad (II)$$

wherein R is a hydrocarbon group having 1 to 8 carbon atoms, a fluorohydrocarbon group having 1 to 8 carbon atoms or a chlorofluorohydrocarbon group having 1 to 8 carbon atoms, x is an integer of 0 to 2, and y is an integer of 0 to 2, provided that the sum of x and y is at least 1, a compound of the formula (III):

$$CF_2=CF-O(CF_2CFYO)_a-(CF_2CF_2CH_2O)_b-CF_2CF_2CH_2Z \quad (III)$$

wherein Y is a fluorine atom or a trifluoromethyl group, Z is a hydrogen atom or a halogen atom, a is an integer of 0 to 2, and b is an integer of 0 to 5, a compound of the formula:

$$CX_2=CXO(CX_2)_nY$$

wherein X is a hydrogen atom or a fluorine atom, Y is a bromine atom or an iodine atom, and n is an integer of 1 to 9, and 4-bromo-3,3,4,4-tetrafluorobutene-1.

When a polyol vulcanizing system is used as a vulcanizing system, preferable examples of the compound providing a vulcanizing site include perfluorophenoxy-substituted olefins.

When a triazine vulcanizing system is used as a vulcanizing system, preferable examples of the compound providing a vulcanizing site include cyano-substitute perfluoro (alkyl vinyl ethers) such as $CF_2=CF-OCF_2CF_2CN$, perfluoro(8-cyano-5-methyl-3,6-dioxa-1-octene), etc.

Other rubber may be selected according to the vulcanizing system which is employed to vulcanize the perfluororubber.

Examples of the other rubber include peroxide-vulcanizable fluororubbers disclosed in JP-A-53-125491 (U.S. Pat. No. 4,243,770); polyol-vulcanizable fluororubbers disclosed in JP-A-51-17969; rubbers having crosslinkable sites disclosed in JP-A-55-108410 (U.S. Pat. No. 4,530,972) and JP-A-62-12734 (U.S. Pat. No. 5,001,278); and crosslinkable general-purpose rubber disclosed in JP-A-55-50050 (U.S. Pat. No. 4,251,399).

The polyfunctional compound used to form the adhesive layer may also be selected according to the vulcanizing system which is employed to vulcanize the perfluororubber.

In the case of the peroxide vulcanizing system, examples of the polyfunctional compounds include polyfunctional vinyl compounds, polyfunctional allyl compounds, polyfunctional (meth)acrylic acid esters, etc. Preferable examples of such compounds include triallyl cyanurate, triallyl isocyanurate, fluorinated triallyl isocyanurate, triacrylformal, triallyl trimellitate, ethylene-bismaleimide, N,N'-m-phenylene-bismaleimide, dipropargyl terephthalate, diallyl phthalate, tetraallyl terephthalamide, tris(diallylamine)-s-triazine, triallyl phosphite, N,N-diallyl acrylamide, trimethylolpropane trimethacrylate, etc.

In the case of the polyol vulcaning system, examples of the polyfunctional compounds include polyhydroxy compounds, poly(pentafluorophenyl) compounds, etc. Preferable examples of such compounds include bisphenol A, bisphenol AF, hydroquinone, and their potassium salts, etc.

In the case of the triazine vulcanizing sytem, the polyfunctional compounds may be polycyano compounds.

Hereinafter, a vulcanizable composition of the perfluororubber and a vulcanizable composition of the other rubber, which are preferably used with each of the above vulcanizing systems, will be explained.

(1) Peroxide Vulcanizing System

When the peroxide vulcanizing system is used as a vulcanizing system, the vulcanizable composition of the perfluororubber comprises the perfluororubber, an organic peroxide and a polyfunctional unsaturated compound.

A particularly preferable perfluororubber for the peroxide-vulcanizing composition is a copolymer of tetrafluoroethylene, the perfluoroalkyl vinyl ether (I) and the above-described component providing a vulcanizing site. Among others, a copolymer comprising tetrafluoroethylene, a perfluoroalkyl vinyl ether of the formula (I) in which Rf is a perfluoromethyl group and n is 0, a component providing a vulcanizing site of the formula (III) in which Z is an iodine atom and a and b are both 0, and a component providing a vulcanizing site of the formula (II) in which R is $C_2F_4$, x is 0 and y is 2; and a copolymer comprising tetrafluoroethylene, perfluoromethyl vinyl ether (a perfluoroalkyl vinyl ether of the formula (I) in which Rf is a trifluoromethyl group and n is 0), a component providing a vulcanizing site of the formula (III) in which Z is an iodine atom and a and b are both 0, and a component providing a vulcanizing site of the formula (II) in which R is $C_2F_4$, x is 0 and y is 2 are particularly preferable.

In general, an organic peroxide may be a compound which can readily generate a peroxide radical in the presence of heat or a redox system. Preferable examples of the organic peroxide include 1,1-bis(tert.-butylperoxy)-3,5,5-trimethylcyclohexane, 2,5-dimethylhexane-2,5-dihydroperoxide, di-tert.-butyl peroxide, tert.-butylcumyl peroxide, dicumyl peroxide, αα'-bis(tert.-butylperoxy)-p-diisopropylbenzene, 2,5-dimethyl-2,5-di(tert.-butylperoxy) hexane, 2,5-dimethyl-2,5-di(tert.-butylperoxy)hexyne-3, benzoyl peroxide, tert.-butylperoxybenzene, 2,5-dimethyl-2,5-di(benzoylperoxy)hexane, tert.-butylperoxyisopropyl carbonate, etc. Among them, dialkyl type peroxides are particularly preferable.

Examples of the polyfunctional compound to be contained in the vulcanizable composition are the same as those exemplified as the polyfunctional compounds to be used in the adhesive layer.

When the peroxide vulcanizing system is used, the vulcanizable composition of the other rubber comprises the other rubber (e.g. a fluororubber or a non-fluorinated rubber), an organic peroxide and a polyfunctional compound.

As the other rubbers, fluororubbers other than the perfluororubbers are preferable. For example, vinylidene fluoride base fluororubbers containing iodine and/or bromine atoms, tetrafluoroethylene base fluororubbers are preferable. Examples of the vinylidene fluoride base fluororubbers include vinylidene fluoride-hexafluoropropylene copolymers, vinylidene fluoride-hexafluoropropylene-tetrafluoroethylene copolymers, etc. Examples of the tetrafluoroethylene base fluororubbers include tetrafluoroethylene-propylene copolymers. Examples of other fluororubbers include hexafluoropropylene-ethylene copolymers.

The other rubber may be any rubber that can be vulcanized with an organic peroxide. Apart from the above fluororubbers, silicone rubbers, fluorosilicone rubbers, EPDM, SBR, NBR, H-NBR, acrylic rubbers, epichlorohydrin rubbers and the like can be used.

The organic peroxide and the polyfunctional compound, which are contained in the vulcanizable composition of the other rubber, may be the same as those exemplified above.

Amounts of the rubber, organic peroxide and polyfunctional compound to be contained in the vulcanizable composition of the perfluororubber or the other rubber may be the same as those in the conventional vulcanizable compositions. For example, 0.05 to 10 wt. parts, preferably 0.5 to 5 wt. parts of the organic peroxide, and 0.1 to 20 wt. parts, preferably 0.5 to 10 wt. parts of the polyfunctional compound are compounded in 100 wt. parts of the rubber.

(2) Polyol Vulcanizing System

When the polyol vulcanizing system is used as a vulcanizing system, a vulcanizable composition comprises the perfluororubber and a polyhydroxy compound.

A preferable perfluororubber for the polyol-vulcanizing composition is a copolymer of tetrafluoroethylene, a perfluoroalkyl vinyl ether (I) and the above-described component providing a vulcanizing site. Among others, a copolymer comprising tetrafluoroethylene, perfluoromethyl vinyl ether and $CF_2\!=\!CF\!-\!OCF_2CF(CF_3)O\!-\!C_6F_5$ is particularly preferable.

The polyhydroxy compound may be any conventional polyhydroxy compound. Preferable examples of the polyhydroxy compound include bisphenol A, bisphenol AF, their potassium salts, etc.

When the polyol vulcanizing system is used, the vulcanizable composition of the other rubber comprises the other rubber and the polyhydroxy compound. When the fluororubber is used, the composition may further contain an onium salt (e.g. quaternary ammonium salts or quaternary phosphonium salts).

As the other rubbers, fluororubbers other than the perfluororubbers are preferable. Examples of the fluororubbers include vinylidene fluoride base fluororubbers such as vinylidene fluoride-hexafluoropropylene copolymers and vinylidene fluoride-hexafluoropropylene-tetrafluoroethylene copolymers.

Apart from the above fluororubbers, epichlorohydrin rubbers may be used as the other rubbers.

The polyhydroxy compound contained in the vulcanizable composition of the other rubber is the same as that exemplified above.

Amounts of the rubber, polyhydroxy compound and optional onium salt to be contained in the vulcanizable composition of the perfluororubber or the other rubber may be the same as those in the conventional vulcanizable compositions. For example, 0.1 to 20 wt. parts of the polyhydroxy compound and 0 to 5 wt. parts of the onium salt are compounded in 100 wt. parts of the rubber. If desired, an acid acceptor such as magnesium oxide, calcium hydroxide, etc. may be used.

(3) Triazine Vulcanizable Composition

When the triazine vulcanizing system is used as a vulcanizing system, the vulcanizable composition comprises the perfluororubber and an organic tin compound.

A preferable perfluororubber for the triazine-vulcanizing composition is a copolymer of tetrafluoroethylene, a perfluoroalkyl vinyl ether (I) and the above-described component providing a vulcanizing site. Among others, a copolymer comprising tetrafluoroethylene, perfluoromethyl vinyl ether and $CF_2$=CF—$OCF_2CF(CF_3)$O—$CF_2CF(CF_3)$CN is particularly preferable.

The organic tin compound may be any conventional organic tin compound. Preferable examples of the organic tin compound include triphenyltin, trioctyltin, dibutyltin dilaurate, etc.

When the triazine vulcanizing system is used, the vulcanizable composition of the other rubber comprises the other rubber and the organic tin compound.

As the other rubbers, fluororubbers other than the perfluororubbers are preferable. Examples of the fluororubbers include vinylidene fluoride base fluororubbers such as vinylidene fluoride-hexafluoropropylene copolymers and vinylidene fluoride-hexafluoropropylene-tetrafluoroethylene copolymers. A component providing a vulcanizing site may be $CF_2$=CF—$OCF_2CF(CF_3)$O—$CF_2CF(CF_3)$CN.

Amounts of the rubber and organic tin compound to be contained in the vulcanizable composition of the perfluororubber or the other rubber may be the same as those in the conventional vulcanizable compositions. For example, 0.1 to 20 wt. parts of the organic tin compound is compounded in 100 wt. parts of the rubber.

Any of the above vulcanizable rubber compositions may contain conventional fillers, reinforcing agents, pigments, processing aids, stabilizers, etc.

Examples of the inorganic fillers, reinforcing agents and pigments include carbon black, titanium oxide, silicon dioxide, talc, clay, calcium carbonate, diatomaceous earth, bariumsulfate, zinc oxide, etc., and examples of the organic fillers, reinforcing agents and pigments include fluorine-containing polymers such as polytetrafluoroethylene, polyvinylidene fluoride, polychlorotrifluoroethylene, tetrafluoroethylene-ethylene copolymers, tetrafluoroethylene-vinylidene fluoride copolymers, etc.

The mixing of the composition may be carried out with any conventional means. For example, open rolls, internal kneaders, and the like are used.

The laminates of the present invention can be used in various applications, for example, oil-, chemical- or weather-resistant packings, O-rings, hoses, other sealing members, diaphragms and valves for use in transportations such as automobiles, ships, aircraft, etc.; packings, O-rings, sealing members, diaphragms, valves, hoses, rolls and tubes used in chemical plants; packings, O-rings, hoses, sealing members, belts, diaphragms, valves, rolls and tubes used in food plant equipment or food processing equipment (including domestic equipment); packings, O-rings, hoses, sealing members, diaphragms, valves and tubes used in nuclear power plant equipment; packings, O-rings, hoses, sealing members, diaphragms, valves, rolls, tubes, mandrels, electric wires, flexible joints, belts, rubber plates, weather strips used in general industrial parts, roll blades of PPC copying machines; and the like.

More specifically, the laminates of the present invention can be used in the following applications:

A. Automobile industries
  1) Sealing purpose
    Core valves for needle valves of carburetors
    Flange gaskets of carburetors
    Power piston packings
    O-ring for fuel-mixing pumps of automobiles
    Seals of cylinder liners
    Seals of valve stems
    Front pump seals of automatic transmissions
    Real axle pinion seals
    Gaskets of universal joints
    Pinion seals of speedometers
    Piston cups of foot brakes
    O-rings and oil seals for torque transmission
    Seals for afterburning apparatuses of exhaust gas
    Bearing seals
    O-rings of fuel pumps
    Seals of fuel hoses
    Seals for automobile air conditioners
  2) Hoses
    Fuel hoses
    EGR (exhaust gas recirculation) tubes
    Twin carburetor hoses
  3) Diaphragms
    Diaphragms of fuel pumps
    Diaphragms for sensors of carburetors
  4) Others
    Vibration-proof rubbers (e.g. motor mounts, exhaust systems)
B. Chemical industries
  1) Seals
    Seals of pumps, flow meters and pipes for chemicals
    Seals of heat exchangers
    Packings of glass condensers of sulfuric acid-producing apparatuses
    Seals of pumps for diffusing and transferring agrochemicals
    Seals of gas pipes
    Seals for plating liquids
    Packings of high temperature vacuum driers
    Roller seals of paper-making belts
    Seals of fuel batteries
    Joint seals of wind tunnels
  2) Rolls
    Triclene(trichloroethylene)-resistant rolls (for dyeing fibers)
  3) Others
    Acid-resistant hoses (for conc. sulfuric acid)

packings for tube joints of gaschromatographic apparatuses and pH meters

Hoses for transferring chlorine gas

Rainwater-draining hoses for tanks of benzene or toluene

Seals, tubes, diaphragms and valve parts of analytical apparatuses and scientific apparatuses C. General instruments and machines 1) Seals Seals of hydraulic and lubrication machines Bearing seals Seals of dry copying machines Seals for windows of dry-cleaning machines Seals of enriching apparatuses for uranium hexafluoride Seal (vacuum) valves of cyclotrons Seals of automatic packaging machines 2) Others Printing rolls, scrapers, tubes and valve parts of printing facilities Coating rolls, scrapers, tubes and valve parts of coating and painting facilities Ink tubes, rolls and belts of printers Belts and rolls of dry copying machines Diaphragms of pumps for analyzing sulfite and chlorine gas in an air (pollution monitoring equipment)

Rolls and belts of printing presses

Squeezing rolls for pickling

D. Aircraft

Valve stem seals of jet engines

Hoses, gaskets and O-rings for fuel supply

Rotating shaft seals

Gaskets of hydraulic machines

Fire wall seals

E. Ships

Stern seals for propeller shafts of screws

Intake and exhaust valve stem seals of diesel engines

Valve seals of butterfly valves

Pivot seals of butterfly valves

F. Foods and medicines

Seals of plate type heat exchangers

Solenoid valves of vending machines

Vial stoppers

G. Appliances

Insulation oil caps for railways

Venting seals of liquid-tight type transformers

Jackets of oil well cables

Furthermore, the laminates of the present invention can be used as O-rings, sealing members, hoses, tubes, diaphragms, rolls, linings and coatings installed at sites which require plasma-resistance in CVD apparatuses, etching apparatuses, oxidative diffusion apparatuses, sputtering apparatuses, ashing apparatuses, ion-implantation apparatuses assembled in facilities for the production of semiconductors, liquid crystal panels, plasma display panels, plasma-addressing liquid crystal panels, field emission display panels, solar battery substrates, etc.; O-rings, sealing members, hoses, tubes, diaphragms and rolls at sites which require chemical resistance in wet etchers, cleaning apparatuses, pipes for chemical liquid, pipes for gases, etc.; and O-rings, sealing members, hoses, tubes, diaphragms and rolls at sites which should be dust-free and metal-free in those apparatuses.

Specific examples of the sites requiring the plasma resistance include O-rings and sealing members for gate valves, quartz windows, chambers, chamber lid, gates, bell jars, couplings, pumps, gas-controlling equipment, and the like, in the facilities for the production of semiconductors, liquid crystal panels, plasma display panels, etc.

Specific examples of the sites requiring the chemical resistance include O-rings, sealing members, hoses, tubes, diaphragms of pumps, rolls for conveying wafers, and the like for resist-development liquids, resist-peeling liquids and wafer-cleaning liquids used in the facilities for producing semiconductors, liquid crystal panels, plasma display panels, etc.

The specific lamination structures of the laminates of the present invention will be explained.

In the case of an O-ring or a square ring (having a square cross section), as shown in FIG. 1, the core is made of other rubber 1, and the perfluororubber 2 is laminated to surround the entire surface of the core. Thereby, an O-ring or a square ring is provided, which has durability in an atmosphere in which it is in contact with a liquid that corrodes conventional rubbers.

Furthermore, only a part of an O-ring or a square ring, which part requires a perfluororubbers, for example, a part in contact with a corrosive liquid, can be made of a layer of a perfluororubber. For example, as shown in FIGS. 2 to 7, only the radially inner or outer surface is formed with the layer of the perfluororubber 2, while other part is formed of the layer of the other rubber 1.

In the case of a rubber roll, the other rubber is wrapped around a metal core, and the perfluororubber is further wrapped around the other rubber layer to form a rubber roll.

When a hose or a tube has a double-layer structure, either one of the inner layer or the outer layer is made of the layer of the perfluororubber, while the other layer is made of the layer of the other rubber. In the case of three or more layer structures, at least one layer is made of perfluororubber, and the remaining layers are made of the other rubber. For example, in the case of the hose or tube having the three-layer structure, the innermost and outermost layers, which are in contact with a liquid flowing in the hose or tube, and an exterior atmosphere, respectively, are made of the perfluororubber, while the intermediate layer is made of the other rubber.

To reinforce the hose or tube, a braided yarn is provided between any pair of the layers.

In the case of a sheet-form article such as a diaphragm, when it has the two-layer structure, one layer is made of the perfluororubber, while the other layer is made of the other rubber. When the sheet-form article has the three or more layer structure, at least one layer is made of the perfluororubber, while the remaining layers are made of the other rubber. For example, in the case of the three-layer structure, the two outer layers are made of the perfluororubber, while the intermediate layer is made of the other rubber.

In the case of a diaphragm, a reinforcing material such as a cloth may be inserted between a pair of the layers, or embedded in each rubber layer.

In the case of a vial stopper, a part of the stopper, which will be in contact with chemicals, is preferably made of the perfluororubber layer.

The laminate of the present invention may be produced by various methods.

For example, the polyfunctional compound is coated on the surface of at least one of the perfluororubber layer or the other rubber layer, preferably on the surface of the other rubber layer, and both layers are laminated with the coated surface facing the other layer, followed by vulcanizing the layers to bond them.

The polyfunctional compound may be used in the form of a dispersion or a solution. A dispersion medium or a solvent can be selected according to the kind of the polyfunctional compound. Preferable examples of the solvent include lower ketones and esters (e.g. acetone, methyl ethyl ketone, ethyl acetate, etc.), alcohols (e.g. methanol, etc.), and aromatic compounds (e.g. toluene, xylene, etc.)

The coating method may be dipping, brush coating, spray coating, and so on.

Before laminating the two layers, either the perfluororubber layer or the other rubber layer is preferably primarily vulcanized to improve the dimensional accuracy of the finished laminate or the molding processability.

After lamination, the layers are vulcanized to bond them. The vulcanizing conditions depend on the kinds of the perfluororubber and the other rubber, the used vulcanizing system and vulcanizing agent, the kind of the molded article, etc. In general, the primary vulcanization is carried out at a temperature of 100 to 230° C. for 1 to 60 minutes, and the secondary vulcanization is carried out at a temperature of 100 to 300° C. for 0 to 48 hours.

EXAMPLES

Hereinafter, the present invention will be explained in detail by the following Examples and Comparative Examples.

In the Examples and Comparative Examples, the properties of the laminates are measured by the following methods:

Adhesion Strength Measurement

A rubber laminate sample for the measurement of adhesion strength, which was produced in the following examples, was subjected to the 180 degree peel test using a tensile tester. Tensile tester: RTA-1T manufactured by ORIENTEC KABUSHIKIKAISHA Pulling speed: 50 mm/min.

Solvent Resistance Test

A rubber laminate sample for the measurement of solvent resistance, which was produced in the following examples, was dipped in various solvents, and the percentage of the volume increase and the change of hardness were measured.

Example 1

A composition consisting of 100 wt. parts of a fluorine-containing elastomer of a vinylidene fluoride-hexafluoropropylene-tetrafluoroethylene copolymer (50/30/20 mole %) containing 0.2 wt. % of iodine (Mooney viscosity of 70 at 100° C.), 20 wt. parts of MT carbon, 4 wt. parts of triallyl isocyanurate (TAIC) (manufactured by NIPPON KASEI KABUSHIKIKAISHA), and 1.5 wt. parts of PERHEXA 25B (manufactured by NOF Corporation) was molded in the form of a sheet having sizes of 25 mm×50 mm×1 mm.

Then, a 10 wt. % solution of TAIC in methyl ethyl ketone was brush coated on the surface of the above uncured rubber sheet to form an adhesive layer.

A composition consisting of 100 wt. parts of a perfluoroelastomer of a tetrafluoroethylene-perfluoromethyl vinyl ether copolymer (60/40 mole %) containing 0.4 wt. % of iodine (Mooney viscosity of 50 at 100° C.), 20 wt. parts of MT carbon (carbon black manufactured by CANCARB), 4 wt. parts of TAIC, and 1.5 wt. parts of PERHEXA 25B was molded in the form of a sheet having sizes of 25 mm×50 mm×1 mm, and then laminated on the uncured rubber sheet having the adhesive sheet. The laminate was primarily vulcanized at 150° C. for 10 minutes, and then secondarily vulcanized at 180° C. for 4 hours to obtain a sample for the measurement of adhesion strength.

Separately, a composition consisting of 100 wt. parts of the above fluorine-containing elastomer, 20 wt. parts of MT carbon, 4 wt. parts of TAIC and 1.5 wt. parts of PERHEXA 25B was molded in the form of a solid cylinder having a diameter of 11 mm and a height of 4.5 mm as an inner layer of the unvulcanized rubber.

Next, a 10 wt. % solution of TAIC in methyl ethyl ketone was brush coated on the surface of the inner layer of the uncured rubber, and dried to form an adhesive layer.

A composition consisting of 100 wt. parts of the above perfluororubber, 20 wt. parts of MT carbon, 4 wt. parts of TAIC and 1.5 wt. parts of PERHEXA 25B was coated on the uncured rubber having the adhesive layer to form an outer layer of the uncured rubber.

Then, the obtained laminate was primarily vulcanized at 150° C. for 10 minutes and secondarily vulcanized at 180° C. for 4 hours to obtain a sample (a cylinder having a diameter of 13 mm and a height of 6.5 mm) for the measurement of solvent resistance.

Comparative Example 1

A sample of the measurement of adhesion strength and one for the measurement of solvent resistance were produced in the same manners as those in Example 1 except that an adhesive layer was formed from a 10 wt. % solution of butyl acrylate in methyl ethyl ketone.

Comparative Example 2

Test samples were produced in the same manners as those in Example 1 except that no adhesive layer was formed.

Comparative Example 3

Test samples were produced in the same manners as those in Example 1 except that neither an adhesive layer nor an outer layer was formed.

Example 2

Test samples were produced in the same manners as those in Example 1 except that a silicone rubber composition KE-7611-U (manufactured by Shin-Etsu Chemical Co., Ltd.) was used in place of the fluorine-containing elastomer composition.

Comparative Example 4

Test samples were produced in the same manners as those in Example 2 except that an adhesive layer was formed from a 10 wt. % solution of butyl acrylate in methyl ethyl ketone.

Comparative Example 5

Test samples were produced in the same manners as those in Example 2 except that no adhesive layer was formed.

Comparative Example 6

Test samples were produced in the same manners as those in Example 2 except that neither an adhesive layer nor an outer layer was formed.

Example 3

Test samples were produced in the same manner as those in Example 1 except that, in place of the fluorine-containing elastomer composition, a composition consisting of 100 wt. parts of ZETBALL 2010 (hydrogenated NBR manufactured by Nippon Zeon Co., Ltd.), 40 wt. parts of MAF-C (manufactured by TOKAI CARBON CO., LTD.), 2.8 wt. parts of PERHEXA 25B, 1.0 wt. part of TAIC, 0.5 wt. part of stearic acid (manufactured by NOF Corporation), 1.5 wt. parts of NAUGURD 445 (manufactured by UNIROYAL CHEMICAL), 1.5 wt. parts of NOKLACK MB (manufactured by OHUCHI SHINKO CHEMICAL INDUSTRIES, LTD.) and 5.0 wt. parts of zinc oxide (manufactured by Sakai Chemical Industry Co., Ltd.) was used.

Comparative Example 7

Test samples were produced in the same manners as those in Example 3 except that an adhesive layer was formed from a 10 wt. % solution of butyl acrylate in methyl ethyl ketone.

Comparative Example 8

Test samples were produced in the same manners as those in Example 3 except that no adhesive layer was formed.

Comparative Example 9

Test samples were produced in the same manners as those in Example 3 except that neither an adhesive layer nor an outer layer was formed.

The test samples produced in the Examples and Comparative Examples were subjected to the above tests for measuring the properties. The results are shown in Table 1.

TABLE 1

|  | Ex. 1 | C. Ex. 1 | C. Ex. 2 | C. Ex. 3 |
|---|---|---|---|---|
| Inner layer | Fluorine-containing elastomer | | | |
| Adhesive layer | TAIC | Butyl acrylate | None | None |
| Outer layer | Perfluoroelastomer | | | None |
| Adhesion test 1 | (After primary vulcanization) | | | None |
| Adhesion strength (kgf/cm) | 2.7 | 2.1 | NG (sticky) | |
| Failure state | Cohesive failure | Cohesive failure | Interface failure | |
| Adhesion test 2 | (After secondary vulcanization) | | | |
| Adhesion strength (kgf/cm) | 2.6 | 2.0 | NG (sticky) | |
| Failure state | Cohesive failure | Cohesive failure | Interface failure | |
| Solvent resistance test | (in acetone at 24° C. for 17 days) | | | |
| Volume increase (%) | 12 | 12 | 12 | 195 |
| Change of hardness (JIS A) | −2 | −2 | −2 | −38 |

|  | Ex. 2 | C. Ex. 4 | C. Ex. 5 | C. Ex. 6 |
|---|---|---|---|---|
| Inner layer | Silicone rubber | | | |
| Adhesive layer | TAIC | Butyl acrylate | None | None |
| Outer layer | Perfluoroelastomer | | | None |
| Adhesion test 1 | (After primary vulcanization) | | | None |
| Adhesion strength (kgf/cm) | 2.5 | 1.5 | NG (sticky) | |
| Failure state | Cohesive failure | Cohesive failure | Interface failure | |
| Adhesion test 2 | (After secondary vulcanization) | | | |
| Adhesion strength (kgf/cm) | 2.5 | 1.5 | NG (sticky) | |
| Failure state | Cohesive failure | Cohesive failure | Interface failure | |
| Solvent resistance test | (in toluene at 24° C. for 17 days) | | | |

TABLE 1-continued

| Volume increase (%) | 30 | 31 | 31 | 243 |
|---|---|---|---|---|
| Change of hardness (JIS A) | −4 | −5 | −5 | −32 |

|  | Ex. 3 | C. Ex. 7 | C. Ex. 8 | C. Ex. 9 |
|---|---|---|---|---|
| Inner layer | Hydrogenated NBR | | | |
| Adhesive layer | TAIC | Butyl acrylate | None | None |
| Outer layer | Perfluoroelastomer | | | None |
| Adhesion test 1 | (After primary vulcanization) | | | None |
| Adhesion strength (kgf/cm) | 2.9 | 1.8 | NG (sticky) | |
| Failure state | Cohesive failure | Cohesive failure | Interface failure | |
| Adhesion test 2 | (After secondary vulcanization) | | | |
| Adhesion strength (kgf/cm) | 2.8 | 1.6 | NG (sticky) | |
| Failure state | Cohesive failure | Cohesive failure | Interface failure | |
| Solvent resistance test | (in toluene at 24° C. for 17 days) | | | |
| Volume increase (%) | 4 | 5 | 5 | 121 |
| Change of hardness (JIS A) | −1 | −2 | −2 | −27 |

What is claimed is:

1. A laminate comprising a first layer of a perfluororubber,
wherein said perfluororubber is a copolymer of a perfluoroalkylene having 2 to 6 carbon atoms, a component providing a vulcanizing site, and a perfluoroalkyl vinyl ether of the formula (I):

$$Rf\text{—}O\text{—}(CFXCF_2O)_n\text{—}CF\text{=}CF_2 \quad (I)$$

wherein Rf is a perfluoroalkyl group having 1 to 5 carbon atoms,
X is a fluorine atom or a trifluoromethyl group, and
n is an integer of 0 to 4;

a second layer of rubber other than a perfluororubber, and an adhesive third layer, disposed between the first and second layers, containing a polyfunctional compound which adheres the first and second layers by vulcanization;

wherein said polyfunctional compound has a functional group which functions as a vulcanizing site for said perfluororubber and a another group which functions as a vulcanizing site for said rubber other than a perfluororubber;

wherein said component providing a vulcanizing site is at least one component selected from the group consisting of 4-bromo-3,3,4,4-tetrafluorobutene-1, a compound represented by formula (II), a compound represented by formula (III) and a compound represented by formula (IV);

wherein said compounds of formulae (II), (III) and (IV) are as follows:

a compound of formula (II):

$$RBr_xI_y \quad (II)$$

wherein R is a hydrocarbon group having 1 to 8 carbon atoms, a fluorohydrocarbon group having 1 to 8 carbon atoms or a chlorofluorohydrocarbon group having 1 to 8 carbon atoms, x is an integer of 0 to 2, and y is an integer of 0 to 2, provided that the sum of x and y is at least 1;

a compound of the formula (III):

$$CF_2=CF-O(CF_2CFYO)_a-(CF_2CF_2CH_2O)_b-CF_2CF_2CH_2Z \quad (III)$$

wherein Y is a fluorine atom or a trifluoromethyl group, Z is a hydrogen atom or a halogen atom, a is an integer of 0 to 2, and b is an integer of 0 to 5; and a compound of formula (IV):

$$CX_2=CXO(CX_2)_nY \quad (IV)$$

wherein X is a hydrogen atom or a fluorine atom, Y is a bromine atom or an iodine atom, and n is an integer of 1 to 9.

2. The laminate according to claim 1, wherein said rubber other than a perfluororubber is a fluorine-containing rubber other than a perfluororubber.

3. The laminate according to claim 1 or 2, wherein said perfluororubber and said rubber other than a perfluororubber are vulcanized with the same polyfunctional compound as that contained in said adhesive layer.

4. The laminate according to claim 1 or 2, which is in the form of an O-ring, a square ring, a rubber roll, a diaphragm, a rubber hose, a rubber tube or a vial stopper.

5. The laminate according to claim 1, wherein said perfluoroalkylene is tetrafluoroethylene.

6. The laminate according to claim 1, wherein 35 to 95% by mole of said perflubroalkylene, 0.01 to 5% by mole of said component providing a vulcanizing site, and 0.1 to 60% by mole of said perfluoroalkyl vinyl ether are polymerized.

7. The laminate according to claim 1, wherein said component providing a vulcanizing site is the compound of formula (II), wherein x is 0 and y is 2.

8. A method for producing a laminate comprising a layer of perfluororubber and a layer of rubber other than said perfluororubber layer, said method comprising the steps of:

coating a polyfunctional compound on a surface of at least one of said layer of the perfluororubber and said layer of the other rubber, laminating the layers with the coated surface facing the other layer, and vulcanizing the layers to adhere them;

wherein said perfluororubber is a copolymer of a perfluoroalkylene having 2 to 6 carbon atoms, a component providing a vulcanizing site, and a perfluoroalkyl vinyl ether of the formula (I):

$$Rf-O-(CFXCF_2O)_n-CF=CF_2 \quad (I)$$

wherein Rf is a perfluoroalkyl group having 1 to 5 carbon atoms,

X is a fluorine atom or a trifluoromethyl group, and n is an integer of 0 to 4; and said component providing a vulcanizing site is selected from the group consisting of 4-bromo-3,3,4,4-tetrafluorobutene-1, a compound represented by formula (II), a compound represented by formula (III) and a compound represented by formula (IV);

wherein said compounds of formulae (II), (III) and (IV) are as follows:

a compound of formula (II):

$$RBr_xI_y \quad (II)$$

wherein R is a hydrocarbon group having 1 to 8 carbon atoms, a fluorohydrocarbon group having 1 to 8 carbon atoms or a chlorofluorohydrocarbon group having 1 to 8 carbon atoms, x is an integer of 0 to 2, and y is an integer of 0 to 2, provided that the sum of x and y is at least 1;

a compound of the formula (III):

$$CF_2=CF-O(CF_2CFYO)_a-(CF_2CF_2CH_2O)_b-CF_2CF_2CH_2Z \quad (III)$$

wherein Y is a fluorine atom or a trifluoromethyl group, Z is a hydrogen atom or a halogen atom, a is an integer of 0 to 2, and b is an integer of 0 to 5; and a compound of formula (IV):

$$CX_2=CXO(CX_2)_nY \quad (IV)$$

wherein X is a hydrogen atom or a fluorine atom, Y is a bromine atom or an iodine atom, and n is an integer of 1 to 9.

9. The method according to claim 8, wherein either one of said layer of the perfluororubber and said layer of rubber other than said perfluororubber layer is primarily vulcanized, while the other layer is unvulcanized.

10. The method according to claim 8, wherein said polyfunctional compound is coated in the form of a dispersion or a solution.

11. The method according to claim 8, wherein said perfluoroalkylene is tetrafluoroethylene.

* * * * *